United States Patent
Fujii et al.

(10) Patent No.: US 10,695,882 B2
(45) Date of Patent: Jun. 30, 2020

(54) CUTTING FLUID SUPPLY DEVICE OF MACHINE TOOL

(71) Applicant: FANUC CORPORATION, Yamanashi (JP)

(72) Inventors: Takaaki Fujii, Yamanashi (JP); Zheng Tong, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/115,643

(22) Filed: Aug. 29, 2018

(65) Prior Publication Data
US 2019/0118324 A1  Apr. 25, 2019

(30) Foreign Application Priority Data
Oct. 20, 2017  (JP) .................... 2017-203824

(51) Int. Cl.
 *B23Q 11/10*  (2006.01)
 *B23Q 11/00*  (2006.01)
 *G05B 19/404*  (2006.01)

(52) U.S. Cl.
 CPC ...... *B23Q 11/1069* (2013.01); *B23Q 11/0042* (2013.01); *B23Q 11/0075* (2013.01); *B23Q 11/1015* (2013.01); *G05B 19/404* (2013.01)

(58) Field of Classification Search
 CPC . B23Q 11/10; B23Q 11/1069; B23Q 11/1023; B23Q 11/1015
 USPC ............................................ 210/167.02, 143
 See application file for complete search history.

(56) References Cited

U.S. PATENT DOCUMENTS

| 6,702,199 B1* | 3/2004 | Sugata | ............... | B23Q 11/1015 |
| | | | | 210/171 |
| 2011/0070042 A1* | 3/2011 | Saito | ............... | B23B 31/20 |
| | | | | 408/59 |

FOREIGN PATENT DOCUMENTS

| CN | 102029547 A | 4/2011 |
| EP | 0 524 747 A1 | 1/1993 |
| JP | H01-074054 U | 5/1989 |
| JP | H07-299749 A | 11/1995 |
| JP | H10-099613 A | 4/1998 |
| JP | H10-296018 A | 11/1998 |

(Continued)

OTHER PUBLICATIONS

An Office Action; "Notice of Reasons for Refusal," mailed by the Japanese Patent Office dated May 14, 2019, which corresponds to Japanese Patent Application No. 2017-203824 and is related to U.S. Appl. No. 16/115,643; with English language translation.

(Continued)

*Primary Examiner* — Claire A Norris
(74) *Attorney, Agent, or Firm* — Studebaker & Brackett PC

(57) ABSTRACT

The cutting fluid supply device of a machine tool includes a storage tank of a cutting fluid, a cutting fluid discharge port which discharges the cutting fluid, at least one pump which feeds the cutting fluid to the cutting fluid discharge port, a first filter, a second filter which has filter performance different from the first filter, a path switching unit which switches the paths of the cutting fluid and a control unit, and the control unit controls the pump and the path switching unit so as to switch, as the paths, to a first path along which the cutting fluid is fed without being passed through the filters, a second path along which the cutting fluid is passed through the first filter and is fed and a third path along which the cutting fluid is passed through the second filter and is fed.

5 Claims, 12 Drawing Sheets

(56) References Cited

FOREIGN PATENT DOCUMENTS

| | | |
|---|---|---|
| JP | H11-333723 A | 12/1999 |
| JP | 2001-121421 A | 5/2001 |
| JP | 2001-198769 A | 7/2001 |
| JP | 2007-050474 A | 3/2007 |
| JP | 2010-188466 A | 9/2010 |
| JP | 2011-126005 A | 6/2011 |
| JP | 2015-077673 A | 4/2015 |
| JP | 2015-160304 A | 9/2015 |
| JP | 3206424 U | 9/2016 |
| WO | 2013/065097 A1 | 5/2013 |

OTHER PUBLICATIONS

Zhang Lei et al., Machine Tool Modification Techniques—Methods, Experiences, Tips, Techniques, Mechanical Industry Press, Dec. 12, 2019, p. 188.

An Office Action mailed by the State Intellectual Property Office of the People's Republic of China dated Dec. 23, 2019, which corresponds to Chinese Patent Application No. 201811203065.0 and is related to U.S. Appl. No. 16/115,643 with English language translation.

\* cited by examiner

CUTTING FLUID SUPPLY DEVICE OF MACHINE TOOL

This application is based on and claims the benefit of priority from Japanese Patent Application No. 2017-203824, filed on 20 Oct. 2017, the content of which is incorporated herein by reference.

BACKGROUND OF THE INVENTION

Field of the Invention

The present invention relates to a cutting fluid supply device of a machine tool.

Related Art

In a machine tool which machines a workpiece (cut material) with a tool, in general, a cutting fluid is discharged from a cutting fluid discharge port, and thus the machining is performed (see, for example, patent document 1). In the machining of the workpiece with the machine tool as described above, as the tool and the machine have advanced, the quality of the machined surface of the workpiece has recently been enhanced, and thus the machined surface close to a mirror surface has been able to be obtained.

In the mirror surface machining of a workpiece, the role of a cutting fluid is important. The cutting fluid is discharged from a cutting fluid discharge port so as not only to cool a tool and a workpiece and perform lubrication at the time of machining but also to play a role in washing away scrapes produced at the time of machining. When the mirror machining is performed, powdered chips which are significantly finer than normal scrapes are produced, and thus it is necessary to wash away the chips with the cutting fluid.
Patent Document 1: Japanese Unexamined Patent Application, Publication No. 2015-77673

SUMMARY OF THE INVENTION

In general, a cutting fluid is supplied from a storage tank to a machine tool, is discharged to a workpiece or the vicinity thereof and is then returned to the storage tank. Hence, in the mirror surface machining, there is a case in which chips produced in the machining are returned to the storage tank, and that the cutting fluid including the chips is supplied from the storage tank to the machine tool again and is discharged from the cutting fluid discharge port to the workpiece or the vicinity thereof. When the cutting fluid including the chips is discharged to the workpiece being subjected to the mirror surface machining or the vicinity thereof, the chips in the cutting fluid may affect the quality of the machined surface.

However, when in order to remove the chips in the cutting fluid, a fine-mesh filter dedicated to the removal of chips is provided partway through a flow path and before the cutting fluid discharge port, since the filter serves as a significant pressure loss, the flow rate of cutting fluid is disadvantageously reduced when normal machining other than the mirror surface machining is performed.

Hence, an object of the present invention is to provide a cutting fluid supply device of a machine tool which can supply a highly filtered cutting fluid when machining requiring a high-quality machined surface is performed and which can supply the cutting fluid without a flow rate being substantially reduced when normal machining is performed.

(1) A cutting fluid supply device of a machine tool according to the present invention is a cutting fluid supply device (for example, a cutting fluid supply device 2 which will be described later) of a machine tool (for example, a machine tool 1 which will be described later) that performs machining on a cut material (for example, a workpiece W which will be described later) with a tool (for example, a tool T which will be described later) attached to a spindle (for example, a spindle 15 which will be described later), the cutting fluid supply device includes: a storage tank (for example, a storage tank 21 which will be described later) which stores a cutting fluid (for example, a cutting fluid F which will be described later); a cutting fluid discharge port (for example, a cutting fluid discharge port 18a which will be described later) which discharges, from the outside of the tool, the cutting fluid to the cut material or the vicinity thereof; at least one pump (for example, a first pump 25 and a second pump 26 which will be described later) which pressurizes the cutting fluid so as to feed the cutting fluid within the storage tank to the cutting fluid discharge port; a first filter (for example, a first filter 27 which will be described later) which is provided outside the storage tank; a second filter (for example, a second filter 28 which will be described later) which is provided outside the storage tank and which has filter performance different from the first filter; a path switching unit (for example, a path switching unit 22 which will be described later) which switches the paths of the cutting fluid from the storage tank to the cutting fluid discharge port; and a control unit (for example, a control unit 23 which will be described later) which controls the pump and the path switching unit, the control unit controls the pump and the path switching unit so as to switch, as the paths, to a first path (for example, a normal mode which will be described later) along which the cutting fluid is fed to the cutting fluid discharge port without being passed through the first filter and the second filter, a second path (for example, the supply path of the cutting fluid F in a first high-quality mode and a second high-quality mode which will be described later) along which the cutting fluid is passed through the first filter and is fed to the cutting fluid discharge port and a third path (for example, the supply path of the cutting fluid F in a third high-quality mode and a fourth high-quality mode which will be described later) along which the cutting fluid is passed through the second filter and is fed to the cutting fluid discharge port.

(2) In the cutting fluid supply device of the machine tool described in (1), the control unit may control the pump and the path switching unit so as to further switch to a fourth path (for example, the supply path of the cutting fluid F in a fifth high-quality mode and a sixth high-quality mode which will be described later) along which the cutting fluid is passed through the first filter and the second filter and is fed to the cutting fluid discharge port.

(3) In the cutting fluid supply device of the machine tool described in (1) or (2), the cutting fluid supply device includes, as the pumps, a first pump (for example, a first pump 25 which will be described later) and a second pump (for example, a second pump 26 which will be described later) which has pump performance different from the first pump, and the control unit may perform control so as to further switch, as the pump which is used when the cutting fluid within the storage tank is fed to the cutting fluid discharge port, to the first pump and the second pump.

(4) In the cutting fluid supply device of the machine tool described in (3), the machine tool includes, in addition to the paths extended from the storage tank to the cutting fluid discharge port, a spindle center-through path (for example, a spindle center-through path 31 which will be described later) along which the cutting fluid is passed within the tool and is discharged from a tip end of the tool and a spindle attachment surface cleaning path (for example, a spindle attachment surface cleaning path 32 which will be described later) along which the cutting fluid is discharged to the attachment surfaces (for example, attachment surfaces 15a and Ta) of the spindle and the tool, and the first pump may also be used as a pump which feeds the cutting fluid within the storage tank to the spindle center-through path, and the second pump may also be used as a pump which feeds the cutting fluid within the storage tank to the spindle attachment surface cleaning path.

(5) In the cutting fluid supply device of the machine tool described in (4), the first filter may also be used as a filter through which the cutting fluid is passed such that the cutting fluid is passed through the spindle center-through path and is discharged from the tip end of the tool, and the second filter may also be used as a filter through which the cutting fluid is passed such that the cutting fluid is passed through the spindle attachment surface cleaning path and is discharged to the attachment surfaces of the spindle and the tool.

According to the present invention, it is possible to provide a cutting fluid supply device of a machine tool which can supply a highly filtered cutting fluid when machining requiring a high-quality machined surface is performed and which can supply the cutting fluid without a flow rate being substantially reduced when normal machining is performed.

DETAILED DESCRIPTION OF THE INVENTION

Figure 1:
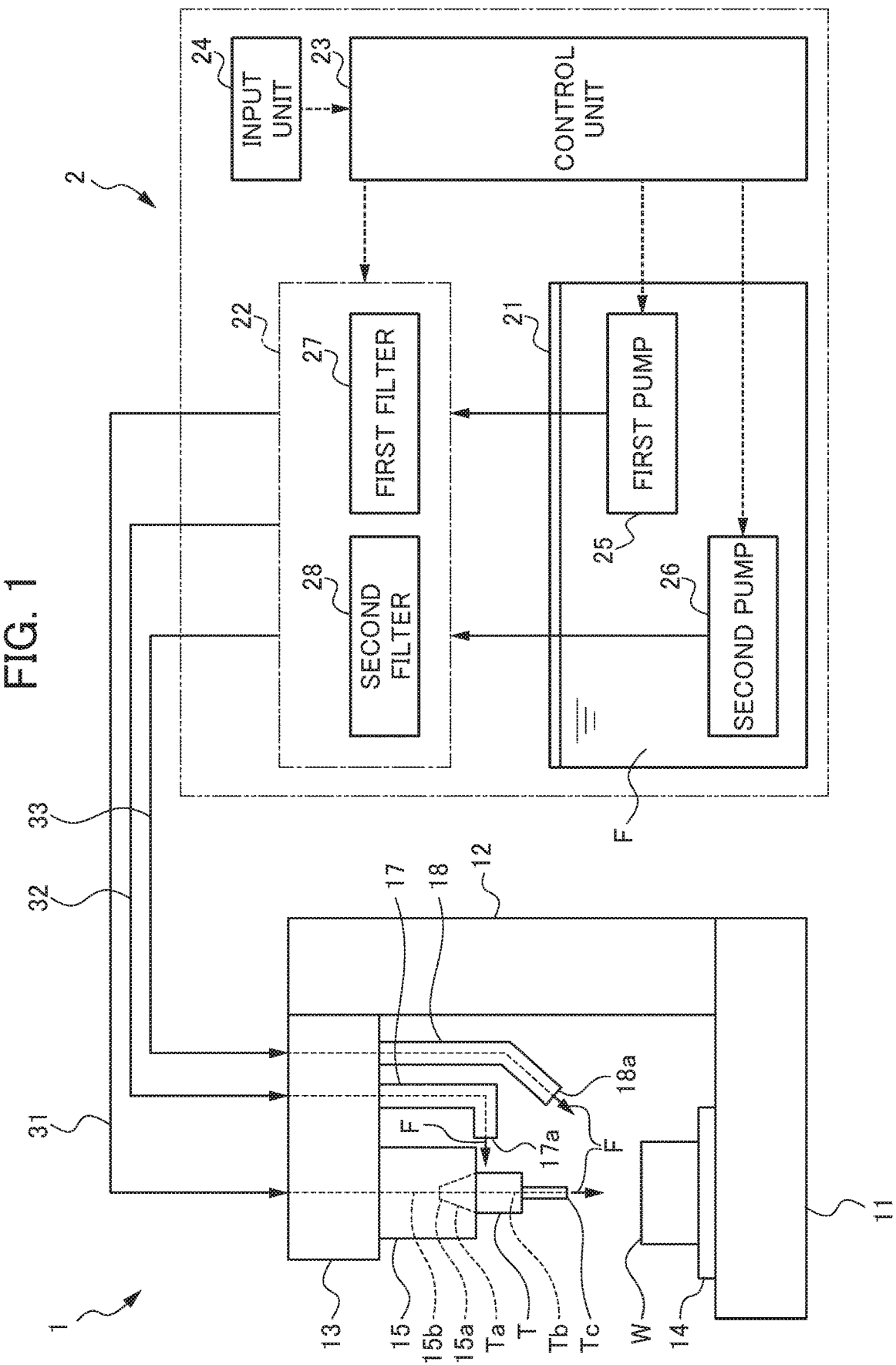
FIG. 1 is an entire schematic configuration diagram showing an embodiment of a cutting fluid supply device of a machine tool according to the present invention.
Figure 2:
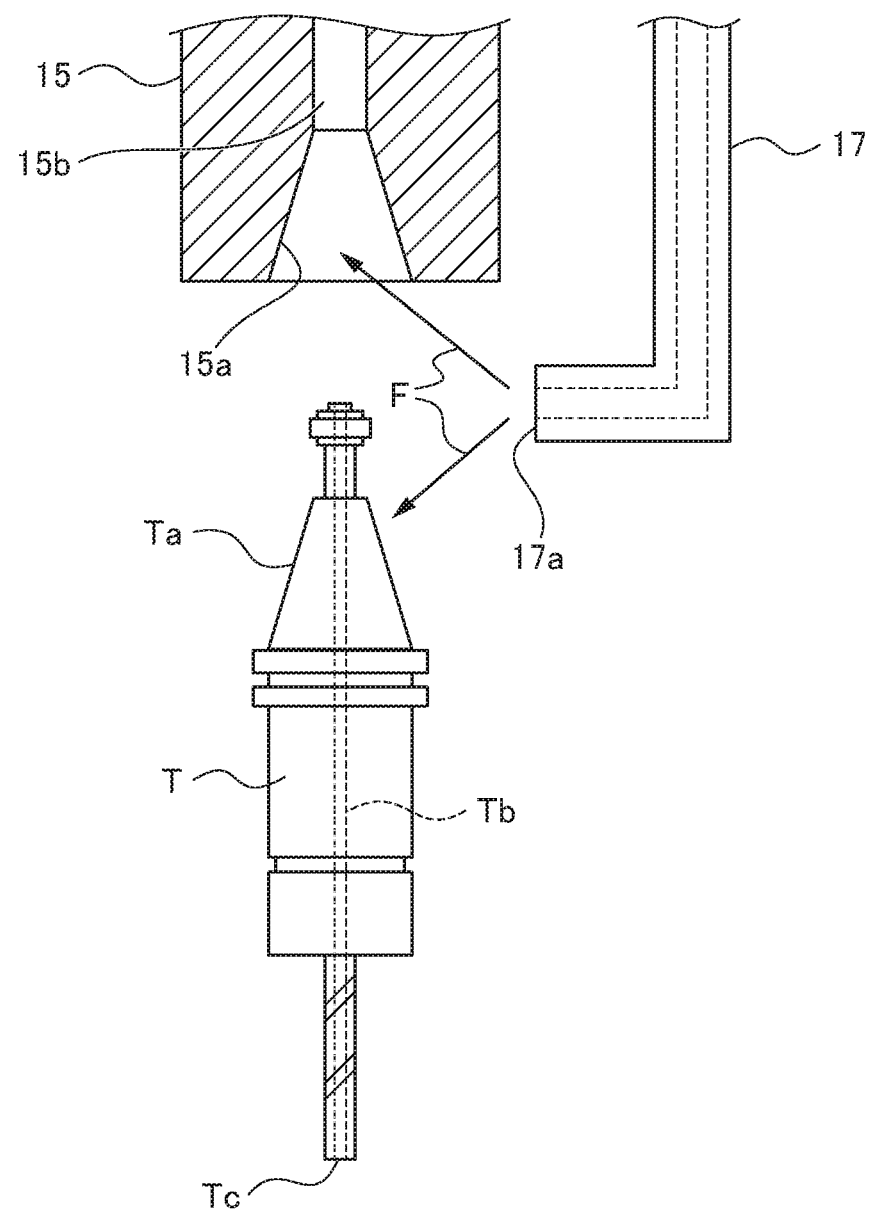
FIG. 2 is a diagram showing a state where a tool is removed from the spindle of the machine tool shown in FIG. 1.

An embodiment of the present invention will be described below with reference to drawings. FIG. 1 is an entire schematic configuration diagram showing an embodiment of a cutting fluid supply device of a machine tool according to the present invention. FIG. 2 is a diagram showing a state where a tool is removed from the spindle of the machine tool shown in FIG. 1. In FIG. 1, the cutting fluid supply device 2 supplies a cutting fluid F stored in a storage tank 21 to the machine tool 1.

The machine tool 1 includes a bed 11, a column 12 which is provided on the bed 11 so as to stand thereon and a spindle head 13 which is coupled to an upper end portion of the column 12. On the bed 11, a table 14 is provided such that the table 14 can be moved in a horizontal direction and can be rotated, and on the table 14, a workpiece W which is a cut material is placed.

The spindle head 13 is extended laterally from the upper end portion of the column 12. A spindle 15 which is extended downward in the direction of the table 14 is attached to the lower surface of the spindle head 13 on a tip end side. As shown in FIG. 2, in a lower end portion of the spindle 15, an attachment surface 15a which is formed in the shape of a cone concave upward (tapered) is provided. An upper end portion of the tool T includes an attachment surface Ta which is formed in the shape of a cone (tapered). The attachment surface Ta of the tool T is fitted to the attachment surface 15a of the spindle 15, and thus the tool T is attached to the lower end portion of the spindle 15. The tool T is supported with an unillustrated turret such that the tool T is removable with respect to the spindle 15.

The machine tool 1 and the cutting fluid supply device 2 are coupled to each other with a spindle center-through path 31, a spindle attachment surface cleaning path 32 and a cutting fluid discharge path 33 such that the cutting fluid F can be circulated.

The spindle center-through path 31 is a flow path of the cutting fluid F which discharges the cutting fluid F, through a tool flow path Tb that is formed to penetrate the tool T attached to the spindle 15, from a tool discharge port Tc that is opened to a tip end of the tool T so as to blow off chips and the like produced in machining. The spindle center-through path 31 is configured with a pipe along which the cutting fluid F is circulated. One end of the spindle center-through path 31 is connected to a path switching unit 22 in the cutting fluid supply device 2 which will be described later, and the other end is connected to a spindle flow path 15b which is formed in the spindle 15. In this way, the cutting fluid F supplied from the cutting fluid supply device 2 through the spindle center-through path 31 is passed through the spindle flow path 15b and the tool flow path Tb and is discharged from the tool discharge port Tc.

Although in FIG. 1, the spindle center-through path 31 is passed within the spindle head 13 and is connected to the spindle flow path 15b, a configuration may be adopted in which the spindle center-through path 31 is connected to the spindle flow path 15b without being passed within the spindle head 13.

The spindle attachment surface cleaning path 32 is a flow path which discharges a cleaning liquid for washing away chips and the like adhered to the attachment surface 15a toward the attachment surface 15a of the spindle 15 after the tool T is removed. The spindle attachment surface cleaning path 32 is configured with a pipe along which the cleaning liquid is circulated. One end of the spindle attachment surface cleaning path 32 is connected to the path switching unit 22 in the cutting fluid supply device 2 which will be described later, and the other end is connected to a spindle attachment surface cleaning nozzle 17 that is attached to the lower end surface of the spindle head 13. As shown in FIG. 2, the spindle attachment surface cleaning nozzle 17 discharges the cleaning liquid from a cleaning liquid discharge port 17a which is opened at a tip end toward the attachment surface 15a of the spindle 15 after the tool T is removed. The spindle attachment surface cleaning nozzle 17 can also discharge the cleaning liquid toward the attachment surface Ta of the tool T after being removed from the spindle 15. In the present embodiment, as the cleaning liquid, the cutting fluid F is used.

Although in FIG. 1, the spindle attachment surface cleaning path 32 is passed within the spindle head 13 and is connected to the spindle attachment surface cleaning nozzle 17, a configuration may be adopted in which the spindle attachment surface cleaning path 32 is connected to the spindle attachment surface cleaning nozzle 17 without being passed within the spindle head 13.

The cutting fluid discharge path 33 is a flow path which discharges the cutting fluid F for washing away chips and the like produced in machining from the outside of the tool T toward the workpiece W and the vicinity thereof. The cutting fluid discharge path 33 is formed with a pipe along which the cutting fluid F is circulated. One end of the cutting fluid discharge path 33 is connected to the path switching unit 22 in the cutting fluid supply device 2 which will be described later, and the other end is connected to a cutting fluid discharge nozzle 18 which is attached to the lower end surface of the spindle head 13. The cutting fluid discharge nozzle 18 discharges the cutting fluid F from a cutting fluid discharge port 18a which is opened at a tip end toward the workpiece W and the vicinity thereof, specifically, the machining point of the workpiece W with the tool T and the vicinity thereof.

It is noted that in FIG. 1, the cutting fluid discharge path 33 is passed within the spindle head 13 and is connected to the cutting fluid discharge nozzle 18, a configuration may be adopted in which the cutting fluid discharge path 33 is connected to the cutting fluid discharge nozzle 18 without being passed within the spindle head 13. The cutting fluid discharge path 33 may discharge the cutting fluid toward only the workpiece W or may discharge the cutting fluid toward only the vicinity of the workpiece W.

The cutting fluid supply device 2 includes the storage tank 21 in which the cutting fluid F is stored, the path switching unit 22 which switches the paths of the cutting fluid F extended from the storage tank 21 toward the machine tool 1, a control unit 23 which performs control on the cutting fluid supply device 2 and an input unit 24.

Within the storage tank 21, a first pump 25 which pressurizes and then feeds the cutting fluid F and a second pump 26 are installed. The first pump 25 is a pump which is used when the cutting fluid F stored within the storage tank 21 is fed through the spindle center-through path 31 to the tool flow path Tb. The second pump 26 is a pump which is used when the cutting fluid F within the storage tank 21 is fed through the spindle attachment surface cleaning path 32 to the spindle attachment surface cleaning nozzle 17. In the present embodiment, the first pump 25 and the second pump 26 are pumps which are also used when the cutting fluid F within the storage tank 21 is fed through the cutting fluid discharge path 33 to the cutting fluid discharge nozzle 18. The drive of the first pump 25 and the second pump 26 is controlled by the control unit 23.

In the present embodiment, as the first pump 25, a high pressure pump as compared with the second pump 26 is used. As the second pump 26, a high lift (high flow rate) pump as compared with the first pump 25 is used.

The path switching unit 22 is controlled by the control unit 23 so as to switch the paths of the cutting fluid F extended from the storage tank 21 toward the machine tool 1. The path switching unit 22 includes a plurality of paths and a plurality of opening/closing valves which will be described later, and a first filter 27 and a second filter 28. Although both the first filter 27 and second filter 28 are filters for removing foreign materials such as chips in the cutting fluid F, filter performance differs therebetween. In the present embodiment, the first filter 27 is a fine-mesh filter as compared with the second filter 28.

Figure 3:
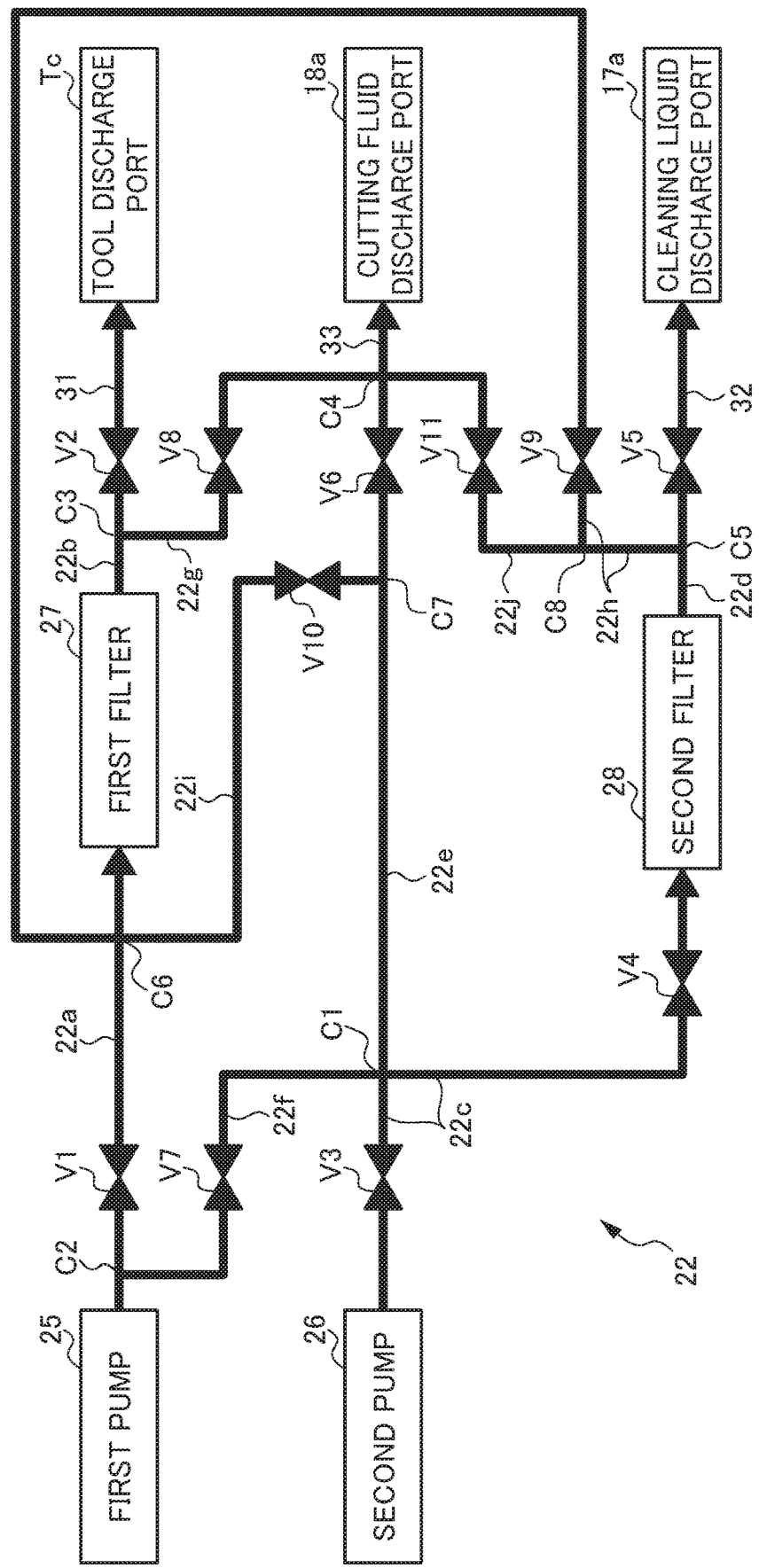
FIG. 3 is a diagram showing an embodiment of a path switching unit shown in FIG. 1.

The specific configuration of the path switching unit 22 is then shown in FIG. 3. FIG. 3 is a diagram showing an embodiment of the path switching unit 22. In FIG. 3, in addition to the path switching unit 22, the first pump 25, the second pump 26, the spindle center-through path 31, the spindle attachment surface cleaning path 32, the cutting fluid discharge path 33, the tool discharge port Tc, the cleaning liquid discharge port 17a and the cutting fluid discharge port 18a are shown. In FIG. 3, the spindle flow path 15b, the tool flow path Tb, the spindle attachment surface cleaning nozzle 17 and the cutting fluid discharge nozzle 18 are omitted. The upstream and downstream which will be described below refer to the upstream and downstream in the direction of circulation of the cutting fluid F supplied by the first pump 25 or the second pump 26 toward the tool discharge port Tc, the cleaning liquid discharge port 17a or the cutting fluid discharge port 18a.

In the path switching unit 22, a first pipe 22a which is extended from the first pump 25 to the first filter 27 and a second pipe 22b which is extended from the first filter 27 to the spindle center-through path 31 are first provided. A first opening/closing valve V1 is provided partway through the first pipe 22a, and a second opening/closing valve V2 is provided partway through the second pipe 22b. The spindle center-through path 31 is connected to an end portion of the second pipe 22b on the downstream side.

In the path switching unit 22, a third pipe 22c which is extended from the second pump 26 to the second filter 28 and a fourth pipe 22d which is extended from the second filter 28 to the spindle attachment surface cleaning path 32 are also provided. A third opening/closing valve V3 and a fourth opening/closing valve V4 are sequentially provided from the upstream side partway through the third pipe 22c, and a fifth opening/closing valve V5 is provided partway through the fourth pipe 22d. The spindle attachment surface cleaning path 32 is connected to an end portion of the fourth pipe 22d on the downstream side.

A fifth pipe 22e is branched from the middle of the third pipe 22c and is connected to the cutting fluid discharge path 33. A connection portion C1 of the third pipe 22c and the fifth pipe 22e is arranged between the third opening/closing valve V3 and the fourth opening/closing valve V4. In the fifth pipe 22e, a sixth opening/closing valve V6 is provided on the downstream side of the connection portion C1. The cutting fluid discharge path 33 is connected to an end portion of the fifth pipe 22e on the downstream side.

A sixth pipe 22f is branched from the middle of the first pipe 22a and is connected to the connection portion C1. A connection portion C2 of the first pipe 22a and the sixth pipe 22f is arranged on the upstream side of the first opening/closing valve V1. A seventh opening/closing valve V7 is provided partway through the sixth pipe 22f.

A seventh pipe 22g is branched from the middle of the second pipe 22b and is connected to the fifth pipe 22e. A connection portion C3 of the second pipe 22b and the seventh pipe 22g is arranged on the upstream side of the second opening/closing valve V2. A connection portion C4 of the fifth pipe 22e and the seventh pipe 22g is arranged on the downstream side of the sixth opening/closing valve V6.

An eighth opening/closing valve V8 is provided partway through the seventh pipe 22g.

An eighth pipe 22h is branched from the middle of the fourth pipe 22d and is connected to the first pipe 22a. A connection portion C5 of the fourth pipe 22d and the eighth pipe 22h is arranged on the upstream side of the fifth opening/closing valve V5. A connection portion C6 of the first pipe 22a and the eighth pipe 22h is arranged on the downstream side of the first opening/closing valve V1. A ninth opening/closing valve V9 is provided partway through the eighth pipe 22h.

A ninth pipe 22i is branched from the middle of the fifth pipe 22e and is connected to the connection portion C6. A connection portion C7 of the fifth pipe 22e and the ninth pipe 22i is arranged on the upstream side of the sixth opening/closing valve V6. A tenth opening/closing valve V10 is provided partway through the ninth pipe 22i.

A tenth pipe 22j is branched from the middle of the eighth pipe 22h and is connected to the connection portion C4. A connection portion C8 of the eighth pipe 22h and the tenth pipe 22j is arranged on the upstream side of the ninth opening/closing valve V9. An eleventh opening/closing valve V11 is provided partway through the tenth pipe 22j.

The opening/closing of the first to eleventh opening/closing valves V1 to V11 is controlled by the control unit 23. The use of the specific first to eleventh opening/closing valves V1 to V11 is not limited as long as the flow paths of the individual pipes can be opened and closed by electrical opening/closing control, and in general, electromagnetic valves are used.

The control unit 23 is electrically connected to the first pump 25 and the second pump 26 within the storage tank 21 so as to control the drive of the individual pumps 25 and 26. The control unit 23 is also electrically connected to the first to eleventh opening/closing valves V1 to V11 within the path switching unit 22 so as to control the opening/closing of the individual opening/closing valves V1 to V11. The control unit 23 may be a control unit which is dedicated to the cutting fluid supply device 2 or may also be used as a control unit which controls the machine tool 1.

The input unit 24 receives various types of input operations from an operator so as to produce outputs to the control unit 23. In the present embodiment, the input unit 24 is formed such that the input unit 24 can switch and set the supply modes of the cutting fluid F which will be described later. Likewise, the input unit 24 may be an input unit which is dedicated to the cutting fluid supply device 2 or may also be used as an input unit which performs various types of input operations on the machine tool 1.

In the present embodiment, the cutting fluid supply device 2 includes, as modes in which the cutting fluid F is supplied to the machine tool 1, a spindle center-through discharge mode, a cleaning liquid discharge mode and a cutting fluid discharge mode. These modes are set by performing input operations on the input unit 24 by the operator, and the path switching unit 22 is controlled by the control unit 23. Hence, the cutting fluid supply device 2 switches, according to the set mode, the supply paths of the cutting fluid F in the path switching unit 22 so as to supply the cutting fluid F to the machine tool 1.

The specific supply paths of the cutting fluid F in the individual modes will then be described with reference to FIGS. 4 to 12. In the first to eleventh opening/closing valves V1 to V11 in the path switching unit 22 shown in FIGS. 4 to 12, white-painted opening/closing valves indicate a state where the flow paths are opened and black-painted opening/closing valves indicate a state where the flow paths are closed. In the first to tenth pipes 22a to 22j, white-painted pipes indicate pipes along which the cutting fluid F is circulated, and black-painted pipes (paths indicated by solid lines) indicate pipes along which the cutting fluid F is not circulated.

[Spindle Center-Through Discharge Mode]

Figure 4:
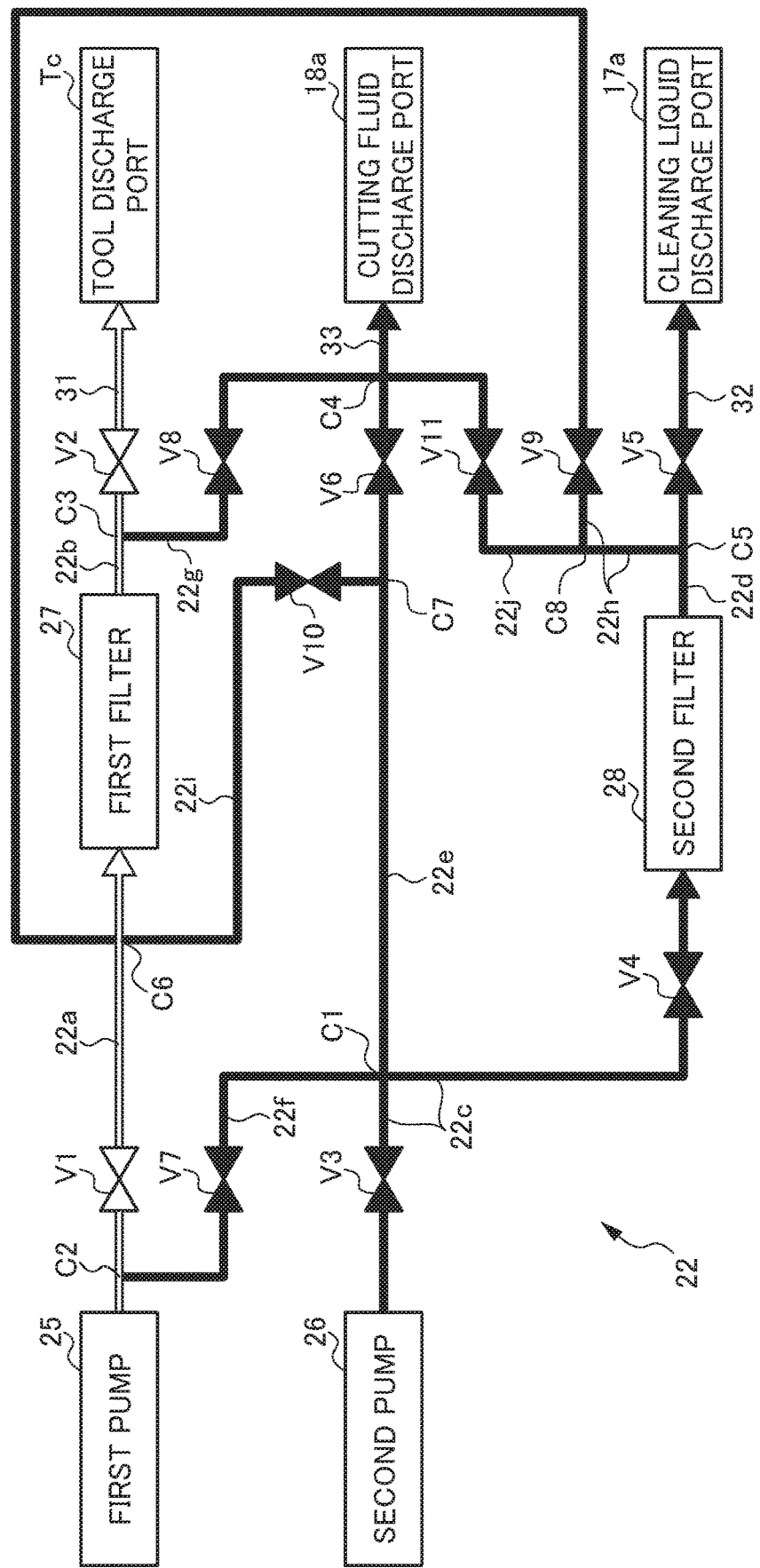
FIG. 4 is a diagram showing one form of the path switching unit in a spindle center-through discharge mode.

FIG. 4 is a diagram showing one form of the path switching unit 22 in the spindle center-through discharge mode. The spindle center-through discharge mode is a mode in which the first pump 25 is used, in which the cutting fluid F within the storage tank 21 is fed to the machine tool 1 and in which the cutting fluid F is discharged from the tool discharge port Tc. The spindle center-through discharge mode can be used when in machining, chips and the like produced in the machining point of the workpiece W with the tool T are required to be blown off by the cutting fluid F.

In the spindle center-through discharge mode, the control unit 23 performs control such that the first opening/closing valve V1 and the second opening/closing valve V2 are opened and that the opening/closing valves other than those are closed. Hence, when the first pump 25 is driven, the cutting fluid F within the storage tank 21 is passed from the first pipe 22a through the first filter 27 (without being passed through the second filter 28) so as to flow into the second pipe 22b. The cutting fluid F which has flown into the second pipe 22b is passed through the spindle center-through path 31 and is finally discharged from the tool discharge port Tc.

Since the cutting fluid F discharged from the tool discharge port Tc is passed through the tool flow path Tb and the tool discharge port Tc which are extremely narrow, when foreign materials such as chips are mixed in the cutting fluid F, clogging easily occurs. However, in the spindle center-through discharge mode, the cutting fluid F is filtered by being passed through the relatively fine-mesh first filter 27 such that foreign materials such as chips in the cutting fluid F are removed. Hence, it is unlikely that clogging occurs in the tool flow path Tb and the tool discharge port Tc.

[Cleaning Liquid Discharge Mode]

Figure 5:
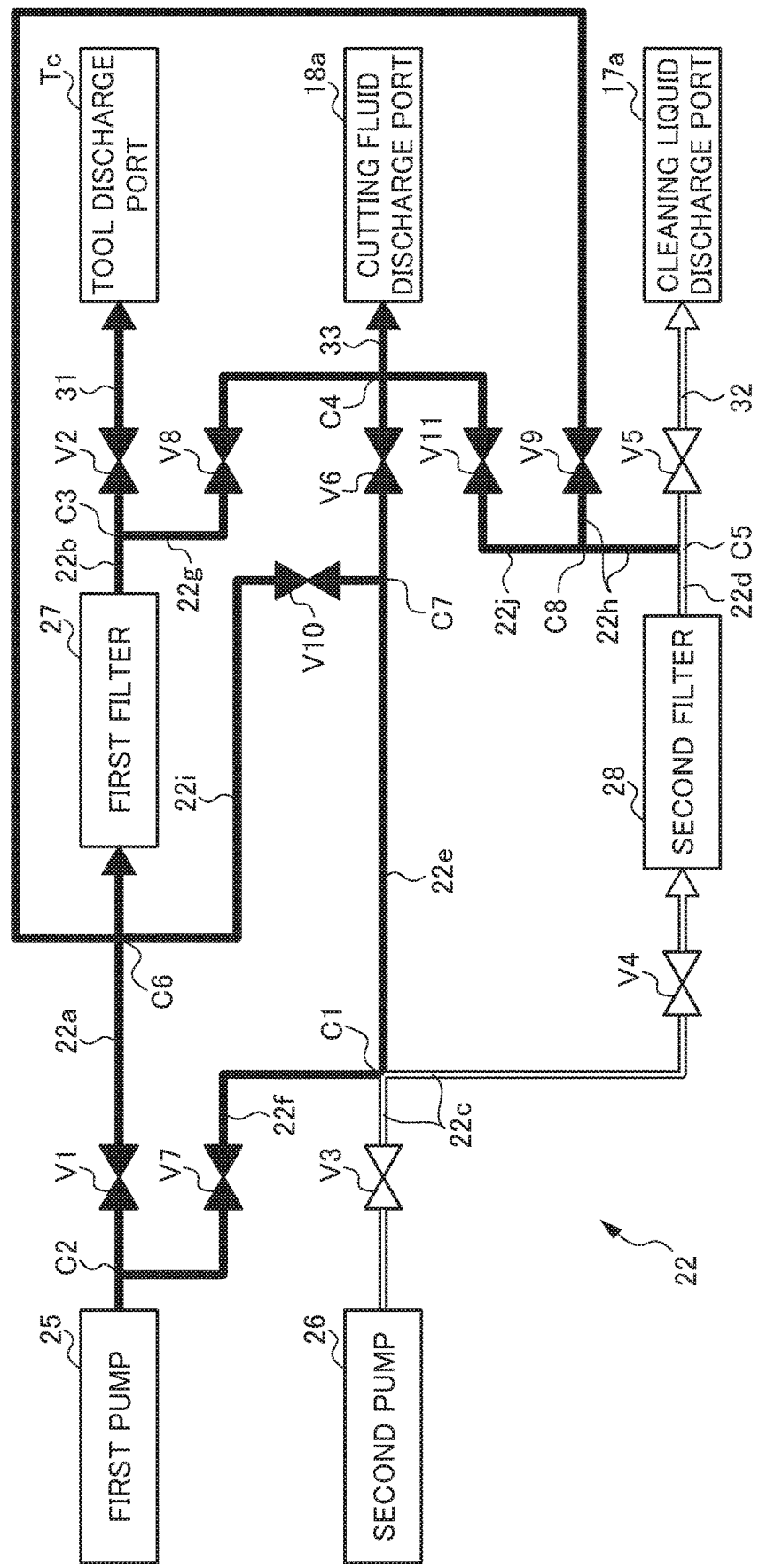
FIG. 5 is a diagram showing one form of the path switching unit in a cleaning liquid discharge mode.

FIG. 5 is a diagram showing one form of the path switching unit 22 in the cleaning liquid discharge mode. The cleaning liquid discharge mode is a mode in which the second pump 26 is used, in which the cutting fluid F within the storage tank 21 is fed to the spindle attachment surface cleaning nozzle 17 of the machine tool 1 and in which the cutting fluid F is discharged from the cleaning liquid discharge port 17a. The cleaning liquid discharge mode can be used when foreign materials such as chips adhered to the attachment surface 15a of the spindle 15 and/or the attachment surface Ta of the tool T are washed away by the cutting fluid F at the time of replacement of the tool T.

In the cleaning liquid discharge mode, the control unit 23 performs control such that the third opening/closing valve V3, the fourth opening/closing valve V4 and the fifth opening/closing valve V5 are opened and that the opening/closing valves other than those are closed. Hence, when the second pump 26 is driven, the cutting fluid F within the storage tank 21 is passed from the third pipe 22c through the second filter 28 (without being passed through the first filter 27) so as to flow into the fourth pipe 22d, and furthermore, the cutting fluid F is passed from the fourth pipe 22d through the spindle attachment surface cleaning path 32 and is finally discharged from the cleaning liquid discharge port 17a.

In the cleaning liquid discharge mode, the cutting fluid F is filtered by being passed through the second filter 28 such that foreign materials such as chips in the cutting fluid F are removed. Hence, the tool T in which foreign materials such as chips are adhered to the attachment surface 15a of the spindle 15 and the attachment surface Ta of the tool T is prevented from being attached, and thus the tool T can be stably attached to the spindle 15.

[Cutting Fluid Discharge Mode]

The cutting fluid discharge mode is a mode in which the cutting fluid F within the storage tank 21 is fed to the cutting fluid discharge nozzle 18 of the machine tool 1 and is discharged from the cutting fluid discharge port 18a to the workpiece W and the vicinity thereof. In the present embodiment, the cutting fluid discharge mode is further divided into seven modes, that is, a normal mode, first to sixth high-quality modes. The cutting fluid supply device 2 is configured so as to be able to select, in the cutting fluid discharge mode, the seven modes by an input operation of the input unit 24. In the following discussion, the individual cutting fluid discharge modes will be described.

<Normal Mode>

Figure 6:
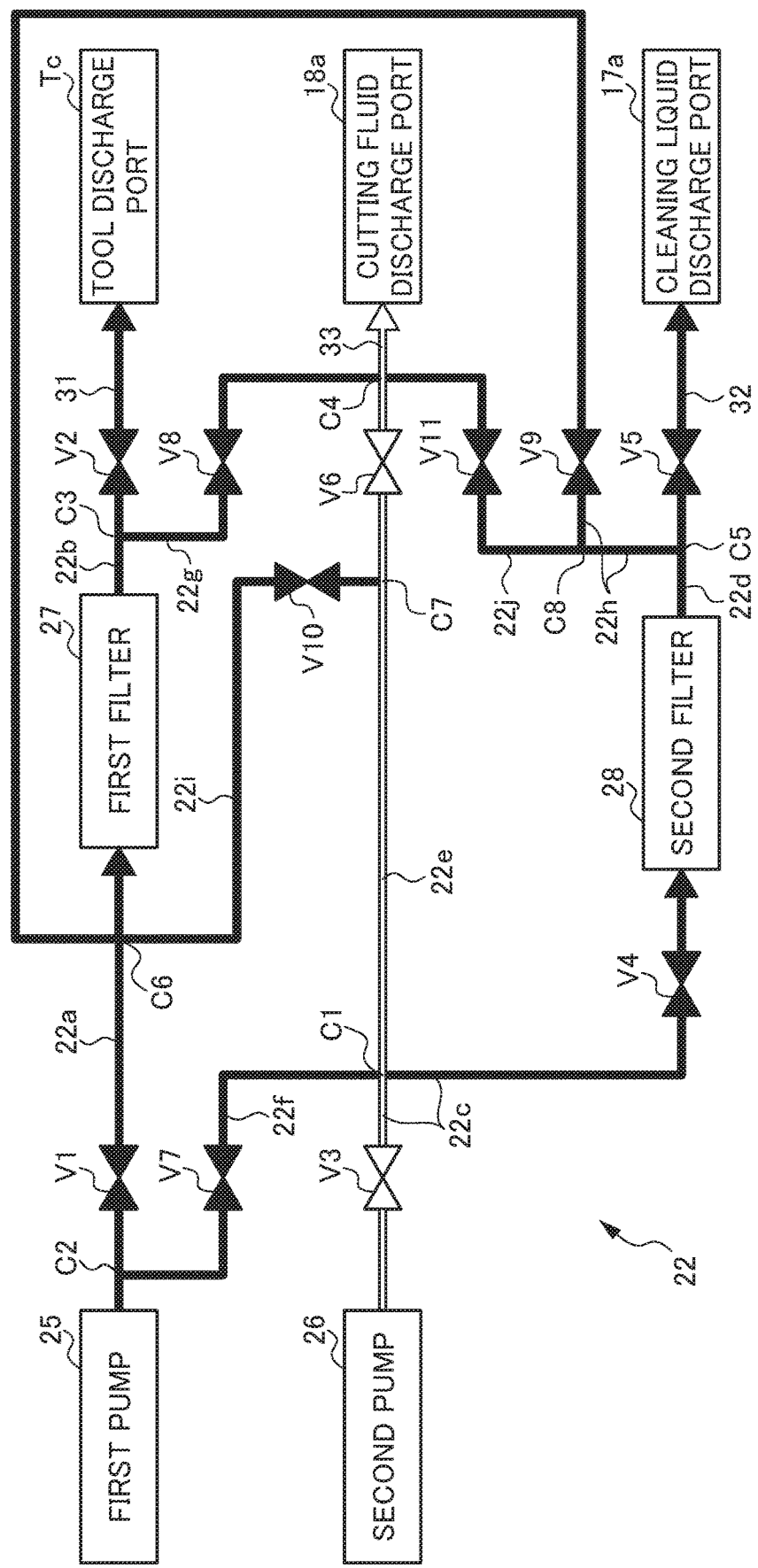
FIG. 6 is a diagram showing one form of the path switching unit in a normal mode.

FIG. 6 is a diagram showing one form of the path switching unit 22 in the normal mode. The normal mode of the cutting fluid discharge mode is a mode in which the second pump 26 is used, in which the cutting fluid F within the storage tank 21 is fed to the cutting fluid discharge nozzle 18 of the machine tool 1 and in which the cutting fluid F is discharged from the cutting fluid discharge port 18a.

In the normal mode, the control unit 23 performs control such that the third opening/closing valve V3 and the sixth opening/closing valve V6 are opened and that the opening/closing valves other than those are closed. Hence, when the second pump 26 is driven, the cutting fluid F within the storage tank 21 is passed from the third pipe 22c through the connection portion C1 so as to flow into the fifth pipe 22e. The cutting fluid F which has flown into the fifth pipe 22e is passed from the fifth pipe 22e through the cutting fluid discharge path 33 and is finally discharged from the cutting fluid discharge port 18a.

As described above, in the normal mode, the cutting fluid F is fed to the cutting fluid discharge port 18a without being passed through the first filter 27 or the second filter 28. Hence, the normal mode can be used when in the machining of the workpiece W, normal machining in which a high-quality machined surface such as a mirror surface is not required is performed. Since the second pump 26 which discharges a high flow rate as compared with the first pump 25 is used, in the normal mode, a high flow rate of cutting fluid F can be supplied from the storage tank 21 without the flow rate of the cutting fluid F being substantially reduced on the cutting fluid discharge port 18a of the machine tool 1. The supply path of the cutting fluid F in the normal mode corresponds to a "first path" in the present invention.

<First High-Quality Mode>

Figure 7:
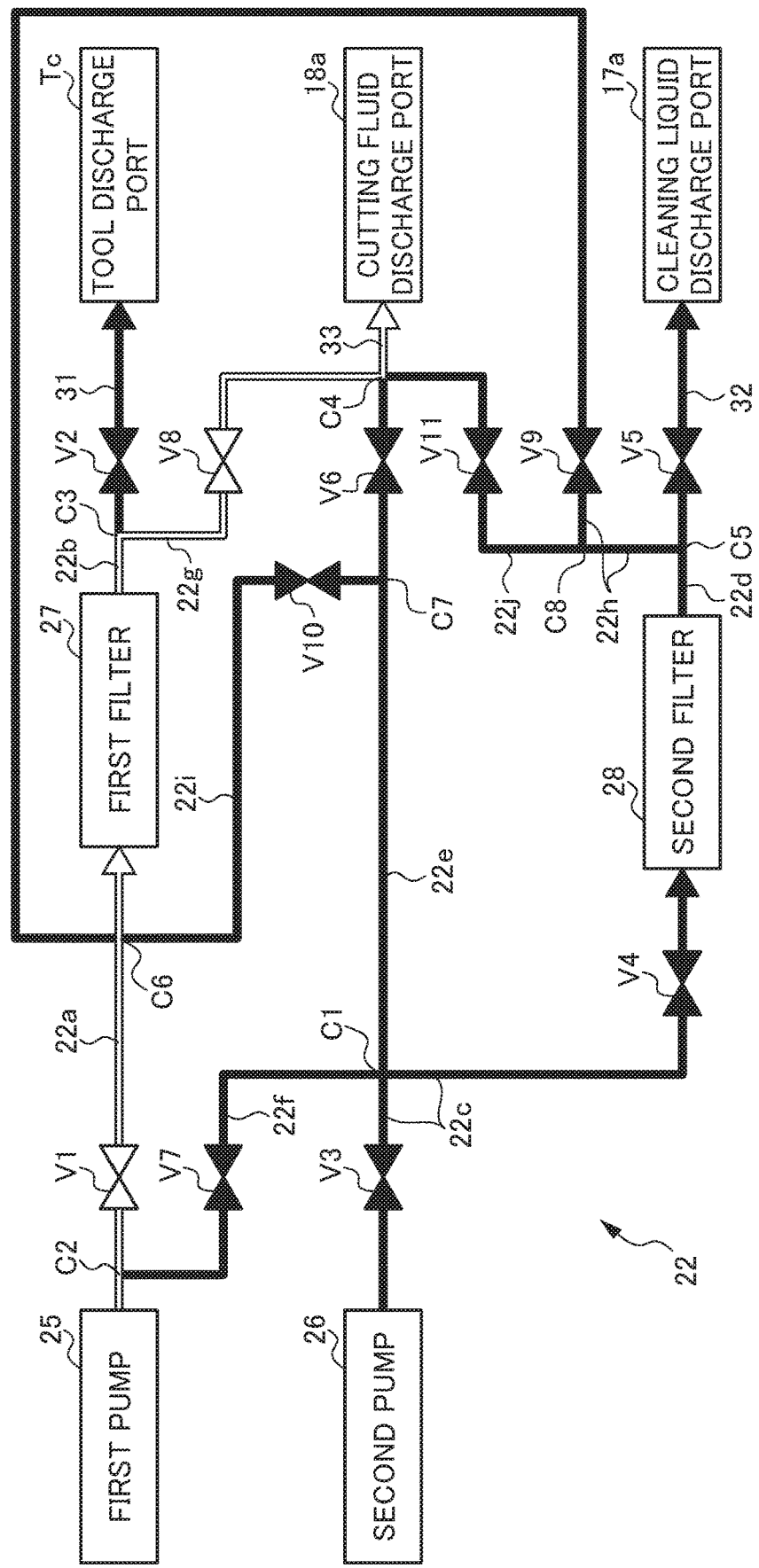
FIG. 7 is a diagram showing one form of the path switching unit in a first high-quality mode.

FIG. 7 is a diagram showing one form of the path switching unit 22 in the first high-quality mode. The first high-quality mode of the cutting fluid discharge mode is a mode in which the first pump 25 is used, in which the cutting fluid F within the storage tank 21 is passed through only the first filter 27 and is fed to the cutting fluid discharge nozzle 18 of the machine tool 1 and in which the cutting fluid F is discharged from the cutting fluid discharge port 18a. The first high-quality mode can be used when in the machining of the workpiece W, machining in which a high-quality machined surface is required is performed.

In the first high-quality mode, the control unit 23 performs control such that the first opening/closing valve V1 and the eighth opening/closing valve V8 are opened and that the opening/closing valves other than those are closed. Hence, when the first pump 25 is driven, the cutting fluid F within the storage tank 21 is passed from the first pipe 22a through the first filter 27 so as to flow into the second pipe 22b. The cutting fluid F which has flown into the second pipe 22b is passed through the connection portion C3 so as to flow into the seventh pipe 22g, and is further passed through the connection portion C4 so as to flow into the fifth pipe 22e. The cutting fluid F which has flown into the fifth pipe 22e is passed though the cutting fluid discharge path 33 and is finally discharged from the cutting fluid discharge port 18a.

In the first high-quality mode, the cutting fluid F is filtered by being passed through the first filter 27 such that foreign materials such as chips in the cutting fluid F are removed. In this way, in the first high-quality mode, the cutting fluid F in which foreign materials such as chips are removed can be discharged from the cutting fluid discharge port 18a to the workpiece W being machined and the vicinity thereof. Since the first filter 27 is a fine-mesh filter as compared with the second filter 28, it is possible to highly remove foreign materials such as chips as compared with a case where the cutting fluid F is passed through the second filter 28. The first pump 25 which is used can feed a high pressure cutting fluid F as compared with the second pump 26. Hence, in the first high-quality mode, when high-quality machining requiring a high-quality machined surface is performed, a more highly filtered high pressure cutting fluid F can be supplied to the workpiece W being machined and the vicinity thereof.

Since the cutting fluid F in the first high-quality mode is passed through the first filter 27 and is fed to the cutting fluid discharge port 18a, the supply path of the cutting fluid F in the first high-quality mode corresponds to a "second path" in the present invention.

<Second High-Quality Mode>

Figure 8:
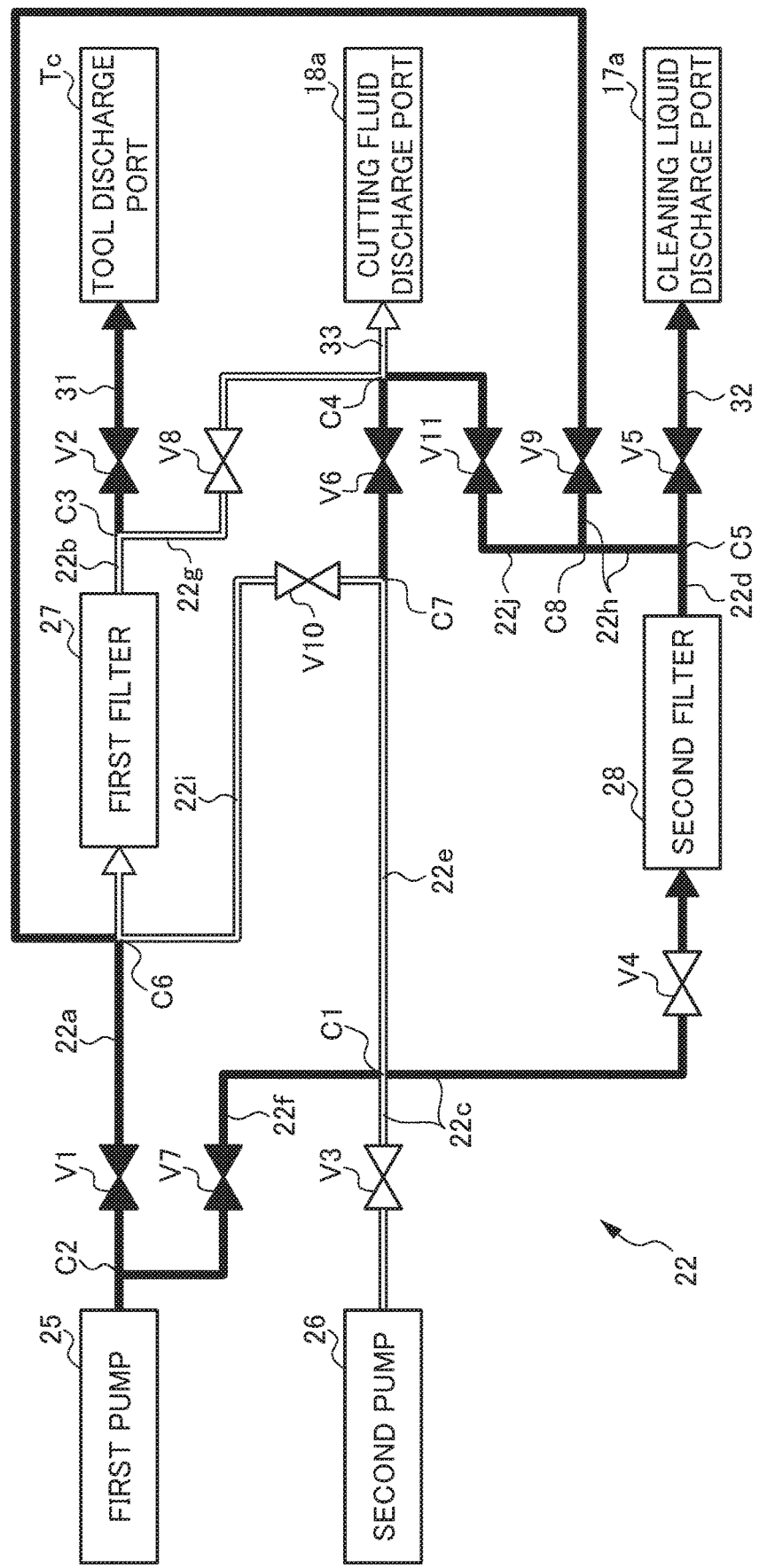
FIG. 8 is a diagram showing one form of the path switching unit in a second high-quality mode.

FIG. 8 is a diagram showing one form of the path switching unit 22 in the second high-quality mode. The second high-quality mode of the cutting fluid discharge mode is a mode in which the second pump 26 is used, in which the cutting fluid F within the storage tank 21 is passed through only the first filter 27 and is fed to the cutting fluid discharge nozzle 18 of the machine tool 1 and in which the cutting fluid F is discharged from the cutting fluid discharge port 18a. The second high-quality mode can also be used when in the machining of the workpiece W, machining in which a high-quality machined surface is required is performed.

In the second high-quality mode, the control unit 23 performs control such that the third opening/closing valve V3, the eighth opening/closing valve V8 and the tenth opening/closing valve V10 are opened and that the opening/closing valves other than those are closed. Hence, when the second pump 26 is driven, the cutting fluid F within the storage tank 21 is passed from the third pipe 22c through the connection portion C1 so as to flow into the fifth pipe 22e. The cutting fluid F which has flown into the fifth pipe 22e is passed through the connection portion C7 so as to flow into the ninth pipe 22i, and is further passed through the connection portion C6 so as to flow into the first pipe 22a. The cutting fluid F which has flown into the first pipe 22a is passed through the first filter 27 so as to flow into the second pipe 22b, and is further passed through the connection portion C3 so as to flow into the seventh pipe 22g. The cutting fluid F which has flown into the seventh pipe 22g is passed through the connection portion C4 so as to flow into the fifth pipe 22e. The cutting fluid F which has flown into the fifth pipe 22e is passed through the cutting fluid discharge path 33 and is finally discharged from the cutting fluid discharge port 18a.

In the second high-quality mode, the cutting fluid F is filtered by being passed through the first filter 27 such that foreign materials such as chips in the cutting fluid F are removed. In this way, in the second high-quality mode, the cutting fluid F in which foreign materials such as chips are removed can be discharged from the cutting fluid discharge port 18*a* to the workpiece W being machined and the vicinity thereof. Since the first filter 27 is a fine-mesh filter as compared with the second filter 28, it is possible to highly remove foreign materials such as chips as compared with a case where the cutting fluid F is passed through the second filter 28. The second pump 26 which is used can feed a high flow rate of cutting fluid F as compared with the first pump 25. Hence, in the second high-quality mode, when high-quality machining requiring a high-quality machined surface is performed, a high flow rate of more highly filtered cutting fluid F can be supplied to the workpiece W being machined and the vicinity thereof.

Since the cutting fluid F in the second high-quality mode is also passed through the first filter 27 and is fed to the cutting fluid discharge port 18*a*, the supply path of the cutting fluid F in the second high-quality mode also corresponds to the "second path" in the present invention.

<Third High-Quality Mode>

Figure 9:
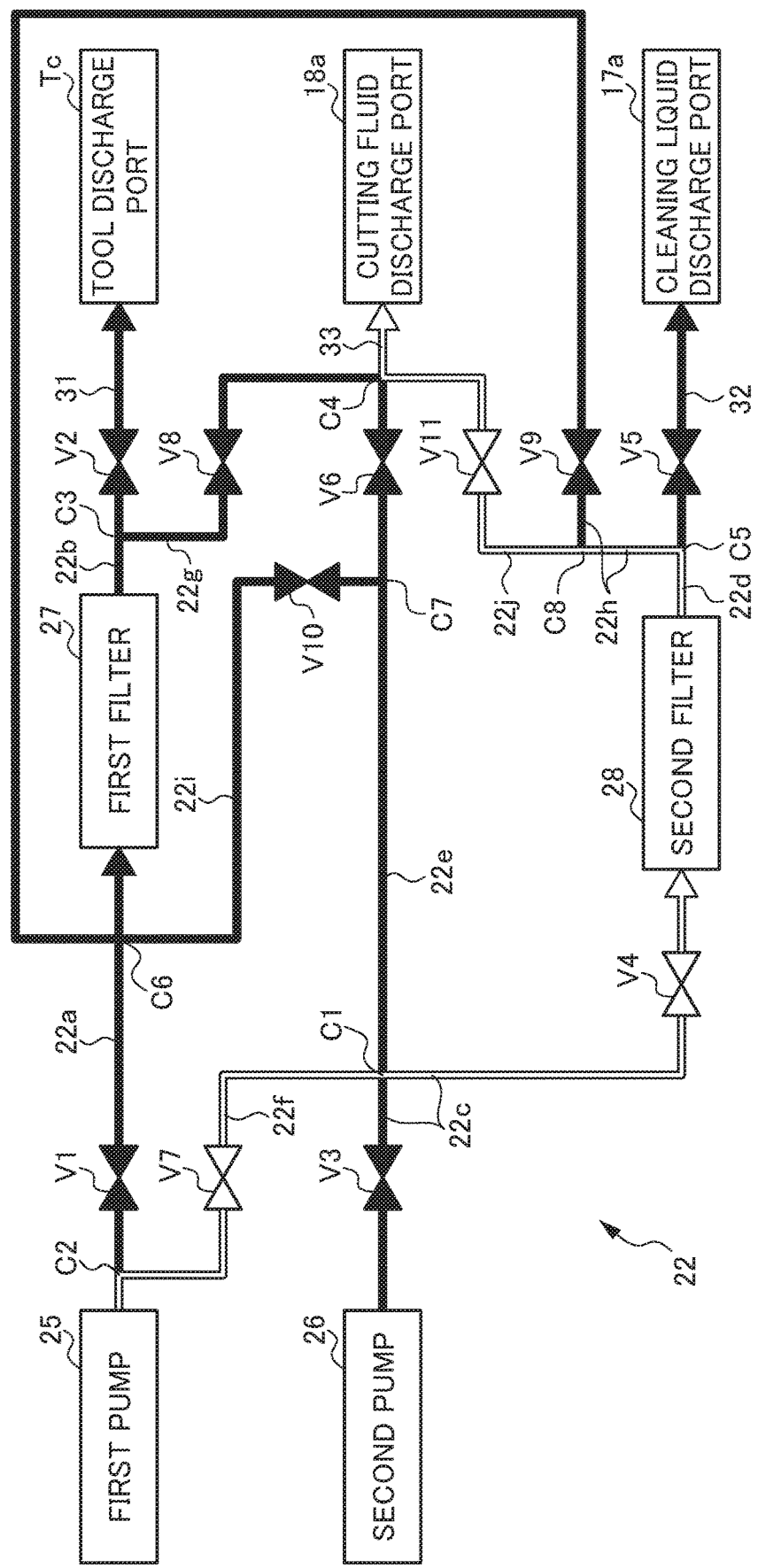
FIG. 9 is a diagram showing one form of the path switching unit in a third high-quality mode.

FIG. 9 is a diagram showing one form of the path switching unit 22 in the third high-quality mode. The third high-quality mode of the cutting fluid discharge mode is a mode in which the first pump 25 is used, in which the cutting fluid F within the storage tank 21 is passed through only the second filter 28 and is fed to the cutting fluid discharge nozzle 18 of the machine tool 1 and in which the cutting fluid F is discharged from the cutting fluid discharge port 18*a*. The third high-quality mode can also be used when in the machining of the workpiece W, machining in which a high-quality machined surface is required is performed.

In the third high-quality mode, the control unit 23 performs control such that the fourth opening/closing valve V4, the seventh opening/closing valve V7 and the eleventh opening/closing valve V11 are opened and that the opening/closing valves other than those are closed. Hence, when the first pump 25 is driven, the cutting fluid F within the storage tank 21 is passed from the first pipe 22*a* through the connection portion C2 so as to flow into the sixth pipe 22*f*. The cutting fluid F which has flown into the sixth pipe 22*f* is passed through the connection portion C1 so as to flow into the third pipe 22*c*, and is passed through the second filter 28 so as to flow into the fourth pipe 22*d*. The cutting fluid F which has flown into the fourth pipe 22*d* is passed through the connection portion C5 so as to flow into the eighth pipe 22*h*, and is further passed through the connection portion C8 so as to flow into the tenth pipe 22*j*. The cutting fluid F which has flown into the tenth pipe 22*j* is passed through the connection portion C4 so as to flow into the fifth pipe 22*e*, is passed from the fifth pipe 22*e* through the cutting fluid discharge path 33 and is finally discharged from the cutting fluid discharge port 18*a*.

In the third high-quality mode, the cutting fluid F is filtered by being passed through the second filter 28 such that foreign materials such as chips in the cutting fluid F are removed. In this way, in the third high-quality mode, the cutting fluid F in which foreign materials such as chips are removed can be discharged from the cutting fluid discharge port 18*a* to the workpiece W being machined and the vicinity thereof. Since the second filter 28 is a large-mesh filter as compared with the first filter 27, a pressure loss is reduced as compared with the first filter 27. The first pump 25 which is used can feed the high pressure cutting fluid F as compared with the second pump 26. Hence, in the third high-quality mode, when high-quality machining requiring a high-quality machined surface is performed, the highly filtered high pressure cutting fluid F can be supplied to the workpiece W being machined and the vicinity thereof.

Since the cutting fluid F in the third high-quality mode is passed through the second filter 28 and is fed to the cutting fluid discharge port 18*a*, the supply path of the cutting fluid F in the third high-quality mode corresponds to a "third path" in the present invention.

<Fourth High-Quality Mode>

Figure 10:
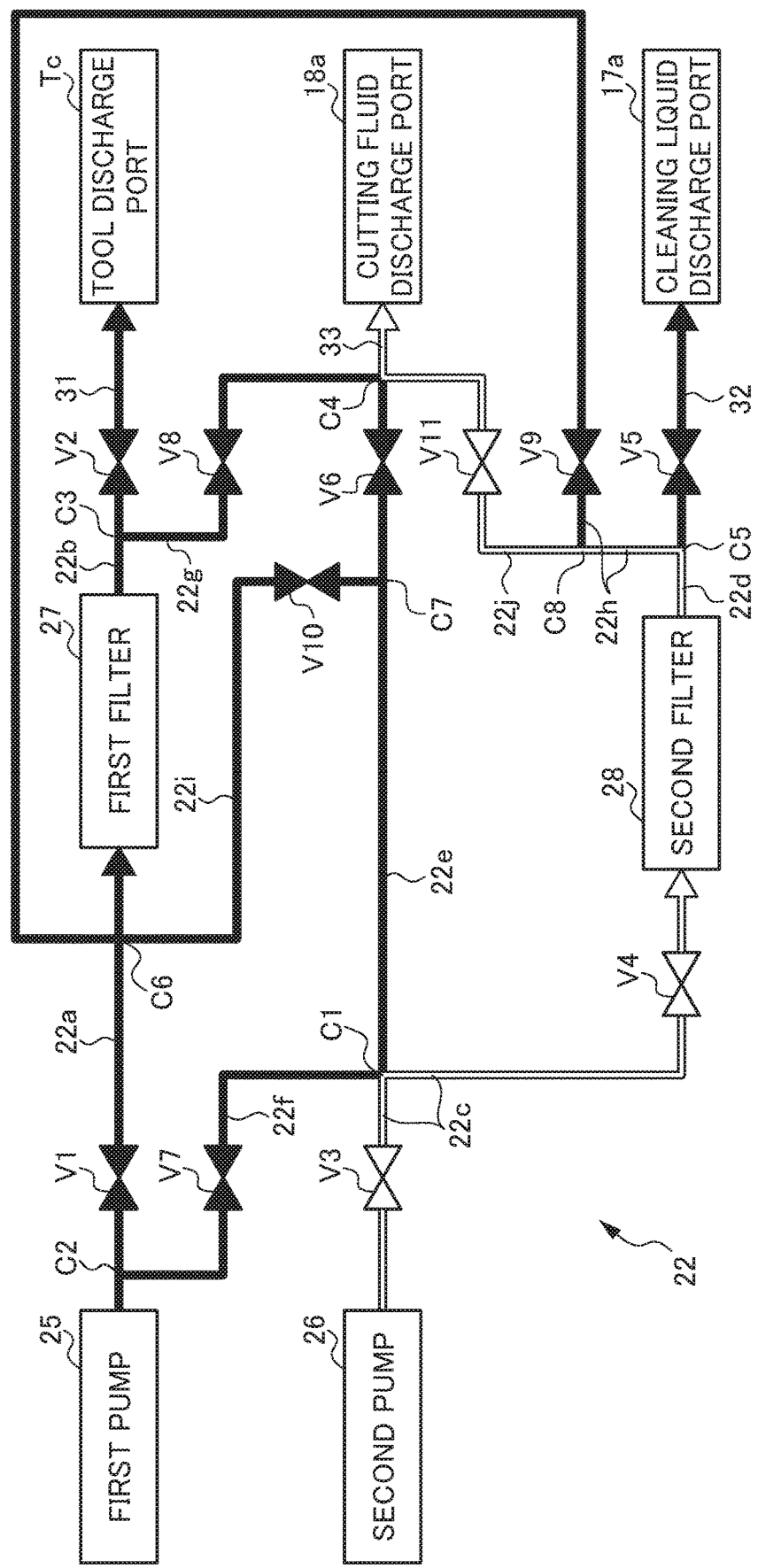
FIG. 10 is a diagram showing one form of the path switching unit in a fourth high-quality mode.

FIG. 10 is a diagram showing one form of the path switching unit 22 in the fourth high-quality mode. The fourth high-quality mode of the cutting fluid discharge mode is a mode in which the second pump 26 is used, in which the cutting fluid F within the storage tank 21 is passed through only the second filter 28 and is supplied to the cutting fluid discharge nozzle 18 of the machine tool 1 and in which the cutting fluid F is discharged from the cutting fluid discharge port 18*a*. The fourth high-quality mode can also be used when in the machining of the workpiece W, machining in which a high-quality machined surface is required is performed.

In the fourth high-quality mode, the control unit 23 performs control such that the third opening/closing valve V3, the fourth opening/closing valve V4 and the eleventh opening/closing valve V11 are opened and that the opening/closing valves other than those are closed. Hence, when the second pump 26 is driven, the cutting fluid F within the storage tank 21 is passed from the third pipe 22*c* through the second filter 28 so as to flow into the fourth pipe 22*d*, and is further passed through the connection portion C5 so as to flow into the eighth pipe 22*h*. The cutting fluid F which has flown into the eighth pipe 22*h* is passed through the connection portion C8 so as to flow into the tenth pipe 22*j*, and is further passed through the connection portion C4 so as to flow into the fifth pipe 22*e*. The cutting fluid F which has flown into the fifth pipe 22*e* is passed from the fifth pipe 22*e* through the cutting fluid discharge path 33 and is finally discharged from the cutting fluid discharge port 18*a*.

In the fourth high-quality mode, the cutting fluid F is filtered by being passed through the second filter 28 such that foreign materials such as chips in the cutting fluid F are removed. In this way, in the fourth high-quality mode, the cutting fluid F in which foreign materials such as chips are removed can be discharged from the cutting fluid discharge port 18*a* to the workpiece W being machined and the vicinity thereof. Since the second filter 28 is a large-mesh filter as compared with the first filter 27, a pressure loss is reduced as compared with the first filter 27. The second pump 26 which is used can feed a high flow rate of cutting fluid F as compared with the first pump 25. Hence, in the fourth high-quality mode, when high-quality machining requiring a high-quality machined surface is performed, a high flow rate of highly filtered cutting fluid F can be supplied to the workpiece W being machined and the vicinity thereof.

Since the cutting fluid F in the fourth high-quality mode is also passed through the second filter 28 and is fed to the cutting fluid discharge port 18*a*, the supply path of the cutting fluid F in the fourth high-quality mode corresponds to the "third path" in the present invention.

<Fifth High-Quality Mode>

Figure 11:
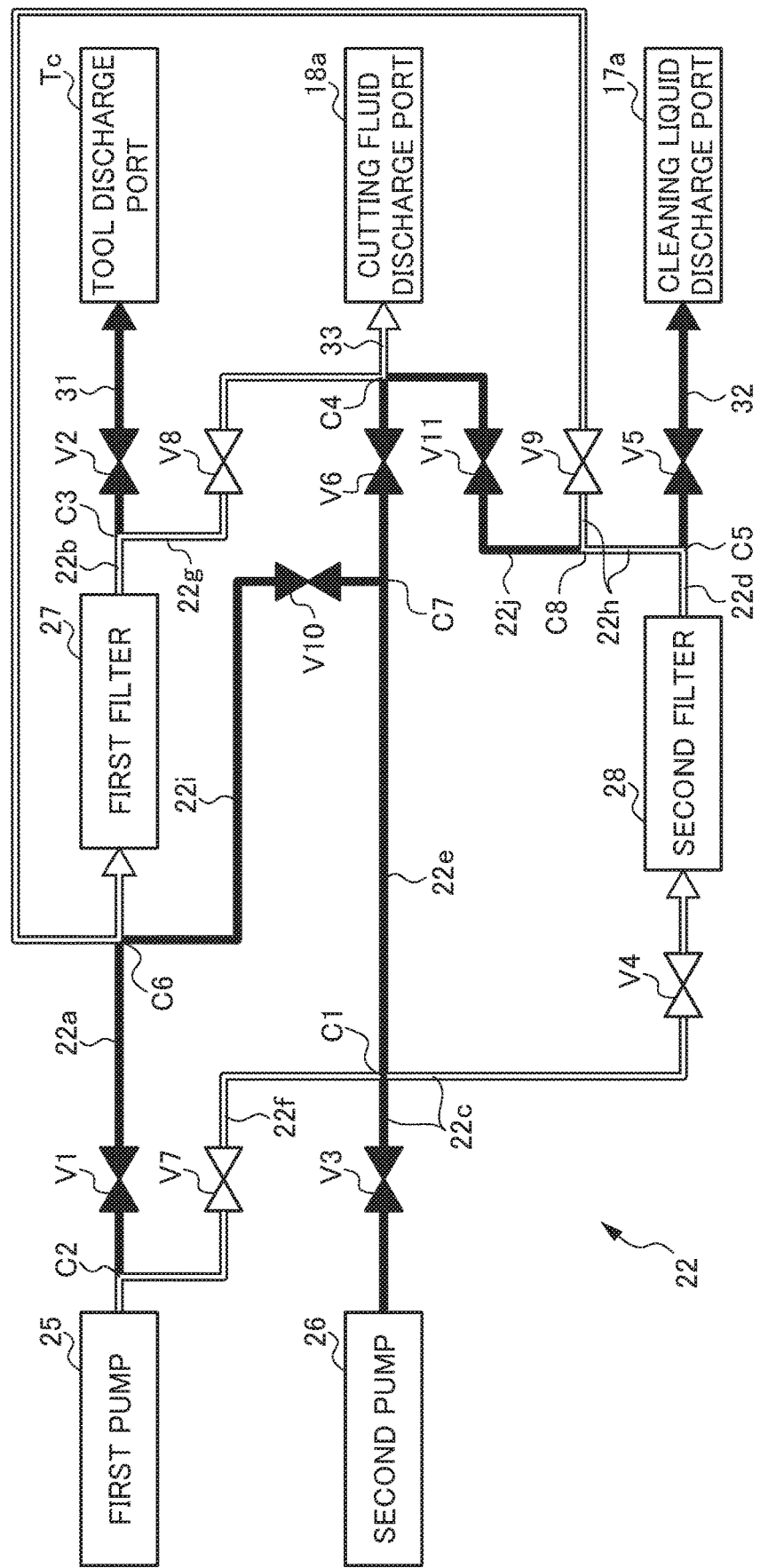
FIG. 11 is a diagram showing one form of the path switching unit in a fifth high-quality mode.

FIG. 11 is a diagram showing one form of the path switching unit 22 in the fifth high-quality mode. The fifth high-quality mode of the cutting fluid discharge mode is a mode in which the first pump 25 is used, in which the cutting fluid F within the storage tank 21 is passed through both the first filter 27 and the second filter 28 and is supplied to the cutting fluid discharge nozzle 18 of the machine tool 1 and in which the cutting fluid F is discharged from the cutting fluid discharge port 18a. The fifth high-quality mode can also be used when in the machining of the workpiece W, machining in which a high-quality machined surface is required is performed.

In the fifth high-quality mode, the control unit 23 performs control such that the fourth opening/closing valve V4, the seventh opening/closing valve V7, the eighth opening/closing valve V8 and the ninth opening/closing valve V9 are opened and that the opening/closing valves other than those are closed. Hence, when the first pump 25 is driven, the cutting fluid F within the storage tank 21 is passed from the first pipe 22a through the connection portion C2 so as to flow into the sixth pipe 22f, and is further passed through the connection portion C1 so as to flow into the third pipe 22c. The cutting fluid which has flown into the third pipe 22c is passed through the second filter 28 so as to flow into the fourth pipe 22d, and is passed through the connection portion C5 so as to flow into the eighth pipe 22h. The cutting fluid F which has flown into the eighth pipe 22h is passed through the connection portion C6 so as to flow into the first pipe 22a, and is passed through the first filter 27 so as to flow into the second pipe 22b. The cutting fluid F which has flown into the second pipe 22b is passed through the connection portion C3 so as to flow into the seventh pipe 22g. The cutting fluid F which has flown into the seventh pipe 22g is passed through the connection portion C4 so as to flow into the fifth pipe 22e, is passed from the fifth pipe 22e through the cutting fluid discharge path 33 and is finally discharged from the cutting fluid discharge port 18a.

In the fifth high-quality mode, the cutting fluid F is filtered by being sequentially passed through the second filter 28 and the first filter 27 such that foreign materials such as chips in the cutting fluid F are removed. In this way, in the fifth high-quality mode, the cutting fluid F in which foreign materials such as chips are more highly removed can be discharged from the cutting fluid discharge port 18a to the workpiece W being machined and the vicinity thereof. The first pump 25 which is used can feed the high pressure cutting fluid F as compared with the second pump 26. Hence, in the fifth high-quality mode, when high-quality machining requiring a high-quality machined surface is performed, the more highly filtered high pressure cutting fluid F can be supplied to the workpiece W being machined and the vicinity thereof.

Since the cutting fluid F in the fifth high-quality mode is passed through the first filter 27 and the second filter 28 and is fed to the cutting fluid discharge port 18a, the supply path of the cutting fluid F in the fifth high-quality mode corresponds to a "fourth path" in the present invention.

<Sixth High-Quality Mode>

Figure 12:
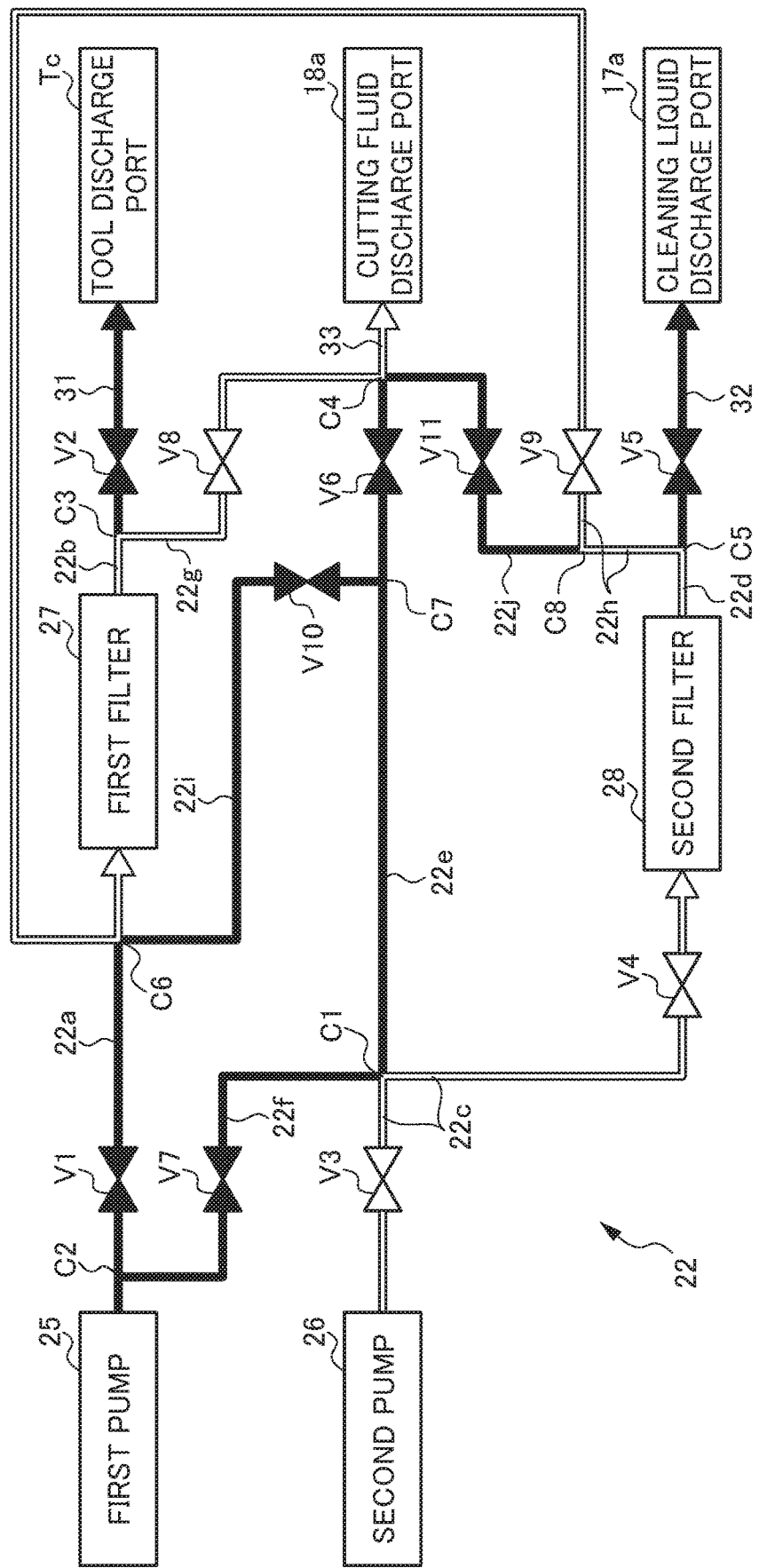
FIG. 12 is a diagram showing one form of the path switching unit in a sixth high-quality mode.

FIG. 12 is a diagram showing one form of the path switching unit 22 in the sixth high-quality mode. The sixth high-quality mode of the cutting fluid discharge mode is a mode in which the second pump 26 is used, in which the cutting fluid F within the storage tank 21 is passed through both the first filter 27 and the second filter 28 and is supplied to the cutting fluid discharge nozzle 18 of the machine tool 1 and in which the cutting fluid F is discharged from the cutting fluid discharge port 18a. The sixth high-quality mode can also be used when in the machining of the workpiece W, machining in which a high-quality machined surface is required is performed.

In the sixth high-quality mode, the control unit 23 performs control such that the third opening/closing valve V3, the fourth opening/closing valve V4, the eighth opening/closing valve V8 and the ninth opening/closing valve V9 are opened and that the opening/closing valves other than those are closed. Hence, when the second pump 26 is driven, the cutting fluid F within the storage tank 21 is passed from the third pipe 22c through the second filter 28 so as to flow into the fourth pipe 22d, and is passed through the connection portion C5 so as to flow into the eighth pipe 22h. The cutting fluid F which has flown into the eighth pipe 22h is passed through the connection portion C6 so as to flow into the first pipe 22a, and is passed through the first filter 27 so as to flow into the second pipe 22b. The cutting fluid F which has flown into the second pipe 22b is passed though the connection portion C3 so as to flow into the seventh pipe 22g and is passed through the connection portion C4 so as to flow into the fifth pipe 22e. The cutting fluid F which has flown into the fifth pipe 22e is passed from the fifth pipe 22e through the cutting fluid discharge path 33 and is finally discharged from the cutting fluid discharge port 18a.

In the sixth high-quality mode, the cutting fluid F is filtered by being sequentially passed through the second filter 28 and the first filter 27 such that foreign materials such as chips in the cutting fluid F are removed. In this way, in the third high-quality mode, the cutting fluid F in which foreign materials such as chips are further removed can be discharged from the cutting fluid discharge port 18a to the workpiece W being machined and the vicinity thereof. The second pump 26 which is used can feed a high flow rate of cutting fluid F as compared with the first pump 25. Hence, in the sixth high-quality mode, when high-quality machining requiring a high-quality machined surface is performed, a high flow rate of more highly filtered cutting fluid F can be supplied to the workpiece W being machined and the vicinity thereof.

Since the cutting fluid F in the sixth high-quality mode is passed through the first filter 27 and the second filter 28 and is fed to the cutting fluid discharge port 18a, the supply path of the cutting fluid F in the sixth high-quality mode also corresponds to the "fourth path" in the present invention.

As described above, the cutting fluid supply device 2 in the present embodiment controls the first pump 25, the second pump 26 and the path switching unit 22 so as to switch, as the cutting fluid discharge mode, the normal mode in which the cutting fluid F is fed to the cutting fluid discharge port 18a without being passed through the first filter 27 or the second filter 28, the first high-quality mode and the second high-quality mode in which the cutting fluid F is passed through the first filter 27 and is fed to the cutting fluid discharge port 18a and the third high-quality mode and the fourth high-quality mode in which the cutting fluid F is passed through the second filter 28 and is fed to the cutting fluid discharge port 18a. Hence, when machining requiring a high-quality machined surface is performed, in the high-quality mode, it is possible to supply the highly filtered cutting fluid F to the machine tool 1 and discharge it from the cutting fluid discharge port 18a whereas when the normal machining is performed, in the normal mode, it is possible to supply the cutting fluid F to the machine tool 1 without the flow rate being substantially reduced and discharge it from the cutting fluid discharge port 18a.

The cutting fluid supply device 2 in the present embodiment controls the first pump 25, the second pump 26 and the path switching unit 22 so as to further switch to the fifth high-quality mode and the sixth high-quality mode in which the cutting fluid F is passed through both the first filter 27 and the second filter 28 and is fed to the cutting fluid discharge port 18*a*. Hence, when machining requiring a higher-quality machined surface is performed, the more highly filtered cutting fluid F can be discharged from the cutting fluid discharge port 18*a* to the machine tool 1.

Furthermore, in the cutting fluid supply device 2 of the present embodiment, in each of the high-quality modes, as the pump used when the cutting fluid F is fed to the cutting fluid discharge port 18*a*, the first pump 25 and the second pump 26 having the different pump performance can be switched. Hence, according to the form of discharge of the cutting fluid F (such as a pressure and a flow rate) required in the high-quality machining on the workpiece W, the cutting fluid F having the optimum discharge form can be discharged from the cutting fluid discharge port 18*a*.

In the present embodiment, as the first pump 25 used for discharging the cutting fluid F within the storage tank 21 from the cutting fluid discharge port 18*a*, the pump which feeds the cutting fluid F within the storage tank 21 to the spindle center-through path 31 is shared, and as the second pump 26, the pump which feeds the cutting fluid F within the storage tank 21 to the spindle attachment surface cleaning path 32 is shared. Hence, as compared with the existing device, the number of pumps is prevented from being increased, and thus it is possible to prevent the size of the device from being increased and prevent the cost from being significantly increased.

Furthermore, in the present embodiment, as the first filter 27 used for discharging the cutting fluid F within the storage tank 21 from the cutting fluid discharge port 18*a*, the filter for passing the cutting fluid F which is circulated along the spindle center-through path 31 and is discharged from the tool discharge port Tc is shared, and as the second filter 28, the filter for passing the cutting fluid F which is circulated along the spindle attachment surface cleaning path 32 and is discharged from the cleaning liquid discharge port 17*a* is shared. Hence, as compared with the existing device, the number of pumps is prevented from being increased, and thus it is possible to prevent the size of the device from being increased and prevent the cost from being significantly increased.

As the pump provided in the cutting fluid supply device 2, it is sufficient that only any one of the first pump 25 and the second pump 26 is used.

EXPLANATION OF REFERENCE NUMERALS

1 machine tool
15 spindle
18*a* cutting fluid discharge port
2 cutting fluid supply device
21 storage tank
22 path switching unit
23 control unit
25 first pump
26 second pump
27 first filter
28 second filter
31 spindle center-through path
32 spindle attachment surface cleaning path
F cutting fluid
T tool
W workpiece (cut material)

What is claimed is:

1. A cutting fluid supply device of a machine tool which performs machining on a cut material with a tool attached to a spindle, the cutting fluid supply device comprising:

a storage tank which stores a cutting fluid;
a cutting fluid discharge port which discharges, from an outside of the tool, the cutting fluid to the cut material or a vicinity thereof;
at least one pump which pressurizes the cutting fluid so as to feed the cutting fluid within the storage tank to the cutting fluid discharge port;
a first filter which is provided outside the storage tank;
a second filter which is provided outside the storage tank and which has filter performance different from the first filter;
a path switching unit which switches paths of the cutting fluid flowing between the storage tank and the cutting fluid discharge port; and
a control unit which controls the pump and the path switching unit,
wherein the control unit controls the pump and the path switching unit so as to switch, as the paths, to a first path along which the cutting fluid is fed to the cutting fluid discharge port without being passed through the first filter and the second filter, a second path along which the cutting fluid is passed through the first filter and is fed to the cutting fluid discharge port and a third path along which the cutting fluid is passed through the second filter and is fed to the cutting fluid discharge port,
the path switching unit is configured such that the cutting fluid can be passed through only the first filter, through only the second filter, and through the second filter and the first filter in series,
the at least one pump includes a first pump and a second pump, the first pump and the second pump both being located upstream of the first filter and the second filter, and
the first pump and the second pump can be controlled individually to pass the cutting fluid through only the first filter, through only the second filter, and through the second filter and the first filter in series.

2. The cutting fluid supply device of the machine tool according to claim 1, wherein the control unit controls the at least one pump and the path switching unit so as to further switch to a fourth path along which the cutting fluid is sequentially passed through the second filter and the first filter before being fed to the cutting fluid discharge port.

3. The cutting fluid supply device of the machine tool according to claim 1, wherein the second pump has pump performance different from the first pump, and
the control unit performs control so as to further switch, as the pump which is used when the cutting fluid within the storage tank is fed to the cutting fluid discharge port, to the first pump or the second pump.

4. The cutting fluid supply device of the machine tool according to claim 3, wherein the machine tool includes, in addition to the paths extended from the storage tank to the cutting fluid discharge port, a spindle center-through path along which the cutting fluid is passed within the tool and is discharged from a tip end of the tool and a spindle attachment surface cleaning path along which the cutting fluid is discharged to attachment surfaces of the spindle and the tool, and
the first pump is also used as a pump which feeds the cutting fluid within the storage tank to the spindle center-through path, and the second pump is also used as a pump which feeds the cutting fluid within the storage tank to the spindle attachment surface cleaning path.

5. The cutting fluid supply device of the machine tool according to claim 4, wherein the first filter is also used as a filter through which the cutting fluid is passed such that the cutting fluid is passed through the spindle center-through path and is discharged from the tip end of the tool, and
  the second filter is also used as a filter through which the cutting fluid is passed such that the cutting fluid is passed through the spindle attachment surface cleaning path and is discharged to the attachment surfaces of the spindle and the tool.

* * * * *